United States Patent [19]

Degelman

[11] 4,319,641
[45] Mar. 16, 1982

[54] ROCK PICKER

[75] Inventor: Wilfred J. Degelman, Regina, Canada

[73] Assignee: Degelman Industries Ltd., Regina, Canada

[21] Appl. No.: 91,094

[22] Filed: Nov. 5, 1979

[51] Int. Cl.³ .............................................. A01B 43/00
[52] U.S. Cl. ..................................................... 171/63
[58] Field of Search ...................... 56/364; 171/63, 64, 171/65, 85, 95, 98, 116, 128

[56] References Cited

U.S. PATENT DOCUMENTS

| 2,888,082 | 5/1959 | Caldwell | 171/63 |
| 2,938,586 | 5/1960 | Gaffney | 171/63 |
| 4,040,489 | 8/1977 | Hulicsko | 171/63 |

FOREIGN PATENT DOCUMENTS

557542  5/1958  Canada .................................. 171/63

Primary Examiner—Robert A. Hafer
Attorney, Agent, or Firm—Lowe, Kokjer, Kircher, Wharton & Bowman

[57] ABSTRACT

A rock picker of the floating rotating reel type has the following features: (1) An intermediate pinion is provided for the drive of the reel at the pivot point for the reel assembly. This enables the reel to pivot to clear obstacles without per se changing the relative driving relationships; center-to-center distances can remain constant regardless of the pivoting of the reel. (2) Loosely attached grille teeth permit rocks to wiggle out from between grille teeth. Each grille tooth is provided with a receptacle and shoulder which bears against an angle-iron transversely located on the frame. Clearance between the receptacle and the angle iron permits wiggling of the teeth to occur. A bolt passing through a spacer flange attached to each tooth prevents the tooth from sliding off the angle iron. (3) The draw bar is vertically pivotally attached to the transverse frame member, and the angle of the frame member to the draw bar is adjustable to permit the rock picker to swing relative to the tractor or other vehicle pulling it. (4) The paddles, generally radially mounted on the reel, are interconnected by coil springs under tension which permit some paddle deflection when large rocks or other obstacles are encountered but which also tend to maintain the paddles in preferred radial orientation. (5) The canopy over the reel, which offers protection to the driver of the tractor from flying stones or the like, is also used to support the reel mounting—no separate mounting arm is needed. (6) The entire grille assembly is capable of pivotal movement about a transverse axis to adjust to surface level variations, and the reel is transversely pivotally mounted on the grille supporting frame, thus permitting double pivotal movement for good response to ground surface obstacles.

22 Claims, 6 Drawing Figures

ROCK PICKER

BACKGROUND OF THE INVENTION

Various types of rock pickers are known in the agricultural industry. The function of a rock picker is to sweep rocks lying at or near the surface of the earth into a hopper or other suitable receptacle so that the rocks may be removed from the earth prior to the commencement of tillage operations.

A rock picker must be robust with sufficient strength and inertia or relative immobility of parts to direct rocks of substantial size into the hopper. On the other hand, it must be recognized that from time to time the rock picker will encounter rocks or other obstacles that are too large to be picked up. In such a case, it is important that the working parts permit an accommodation of such obstacles without damage to the rock picker itself.

The general trend in rock picker design has been to increase size and strength of parts while maintaining relative rigidity. This design approach has increased the cost of rock pickers and likewise has increased the size of the repair bill when the rock picker ultimately is damaged by a rock or other obstacle too big to be handled.

SUMMARY OF THE INVENTION

The general approach taken in the present invention to the design of a rock picker might be characterized as "controlled flexibility". This design approach manifests itself in the present invention in the following ways:

(1) Floating Reel: The reel assembly bearing the rock-sweeping or picking paddles is permitted to pivot about a transverse pivotal axis, permitting the entire reel assembly to "float" relative to the surface of the earth. The floating action permits the reel assembly to pivot upwardly to clear large and relatively immovable objects encountered on the earth as the rock picker passes over the earth. The foregoing design approach is not new per se, but its implementation as hereinafter described overcomes certain problems with previous designs.

A difficulty in devising a suitable floating reel assembly heretofore has been the problem created by the change in orientation and length of the drive train for the rotating reel, as the reel pivots about its axis. This problem is solved according to the invention by providing an intermediate pinion or other suitable rotating element having an axis of rotation coincident with the pivotal axis of the reel assembly. This intermediate element is driven by the source of rotary drive power for the reel (conventionally attached to the frame—this may be, for example, drive power from the carrying wheels for the rock picker or a separate power takeoff drive from the tractor or other vehicle pulling the rock picker). The intermediate element is also drivably connected to the reel itself (if desired, through further intermediate drive linkages, but most suitably directly by means of a chain or belt). In this way the distance and orientation between the axis of rotation of the reel and the source of rotary drive power for the rock picker can change as the reel assembly pivots about its transverse axis, without difficulty. Since the two distances, one between the intermediate pinion or other rotary element and the reel, and the other between that intermediate element and the source of rotary drive motion, can both remain constant when the reel pivots, the pivoting action of the reel assembly may be accommodated without disrupting the drive thereto.

(2) Double Pivotal Action: The preferred embodiment of the present invention also provides double pivoting action—the grille assembly is transversely pivotally mounted on the rock picker frame, and the reel assembly is transversely pivotally mounted on the support frame for the grille assembly. Thus both gradual and sudden variations in ground surface conditions can be accommodated—the grille assembly pivots to maintain the grille teeth at or near ground surface level, and the reel pivots relative to the grille assembly to accommodate large rocks, etc.

(3) Paddle Deflection: The individual rock-sweeping paddles pivotally mounted on the reel and radially extending therefrom are coupled to one another by means of coil springs or the like under tension. In unstressed circumstances, the tension forces between all of the coil springs connected between the paddles balance one another and maintain the paddles in a preferred generally radially extending orientation. However if a given paddle strikes a relatively large rock or other obstacle, the paddle may deflect by an amount dependent upon the force exerted by the object struck against the paddle teeth. The deflection is accommodated by the coil spring and by consequent deflection of one or more additional paddles on the reel. Since the paddles are all coupled to one another through the coil springs and the coil springs are not directly coupled to the reel frame, a relatively large permitted deflection is accommodated without undue stressing of the mechanism. This is in contrast to some previous spring loaded paddle design approaches in which deflection of the paddle stresses an individual spring connected between the paddle and the reel frame—a response which limits the accommodation to three elements, namely the paddle striking the object, the spring attached thereto, and the reel frame itself. By contrast, the deflection of a paddle in apparatus constructed according to the invention is accommodated by possible deflection of several paddles and the coil springs interconnecting those paddles.

(4) Grille Design: The grille teeth are relatively loosely attached to the frame element supporting them, to permit wiggling of the teeth relative to one another. This permits rocks which otherwise might tend to become lodged firmly between adjacent teeth to become dislodged. To this end each grille tooth according to a preferred embodiment of the invention is provided with a shoulder and a recess, cutaway or receptacle. In such preferred embodiment, a transverse angle iron on the frame mates in a loose fit with the shoulder and recess whereby, when the tooth is stressed, as by upward rearward forces exerted by a rock or the like encountered on the ground, the stress is taken by a bearing face on the angle iron against which the shoulder on the grille tooth bears. A removable bolt or the like passing through a spacer flange of the tooth prevents the tooth from falling off the angle iron when the tooth is not being stressed, as when the rock picker is at rest. Individual worn or damaged teeth can be replaced simply be removing this bolt. The spacer flange maintains the upper portions of adjacent teeth separate from one another by a suitable distance calculated to enable the paddle teeth to sweep between the upper portions of the grille teeth.

(5) Draw Bar-Frame Design: The draw bar is pivotally attached, about a vertical pivotal axis, to one side of a transverse frame element of a preferred embodiment of the rock picker according to the invention, so that the angle between the frame element and the draw bar may be varied. This permits the rock picker either to be disposed immediately behind the tractor or other pulling vehicle, or to be offset therefrom, according to the wishes of the operator. The preferred angle of orientation is maintained in conventional fashion by means of a hydraulic piston and cylinder assembly.

(6) Reel Canopy Design: As an economy measure, the canopy over the reel, which offers protection to the driver of the tractor or the like from flying stones which might be swept upwardly and forwardly by the paddles, has the dual function of protection and also support for the reel mounting. By utilizing the canopy for the reel mounting, the requirement of a separate mounting arm for the reel is eliminated.

The scope of the invention is as set forth in the accompanying claims. Each of the above design features can be utilized individually, and the use of any one feature would be expected to result in an improved rock picker. However, maximum advantage is obtained by the use of these design features when they are combined together in a single machine, as in the preferred embodiment to be described in detail below. The first four features mentioned above fall within the "controlled flexibility" design approach mentioned; the fifth feature might also be considered to fall within that design approach in that the operator of the vehicle may selectably vary the angle of orientation of the rock picker relative to the vehicle so as to permit the rock picker to avoid objects on the earth's surface which are too large to be handled, and also to steer the rock picker into the path of objects desired to be picked up. The sixth of the above-mentioned design features is really an economy feature rather than a "controlled flexibility" feature.

DETAILED DESCRIPTION WITH REFERENCE TO THE DRAWINGS

The embodiment of the rock picker illustrated is designated generally by reference numeral 10. It is suitably pulled by a tractor or other vehicle (not shown) by means of a draw bar 12 provided with a forward hitch 14 and terminating at the rear end thereof in a frame connector element 16. The frame connector 16 is pivotally attached by means of bolt or pin 18 to transverse frame member 20, which supports the rock picker assembly. The rock picker 10 is itself supported above the ground by means of wheels 22, 24 mounted on axles 26, 28 respectively which in turn are mounted on plates 30, 32 bolted to brackets 34 and 36 respectively fixed to the transverse frame element 20. Preferably axles 26, 28 are provided with rotatable hubs which house integral bearings. At the rear end of bracket 34 is a hydraulic cylinder support mount 38; a complementary hydraulic cylinder support mount 40 is fixed to the rear end of frame connector element 16. Between the support mounts 38 and 40 is a conventional hydraulic piston and cylinder assembly 42. The displacement of the piston 44 of assembly 42 determines the angle taken by the transverse frame element 20 with respect to the draw bar 12. Hydraulic piston and cylinder assembly 42 would normally of course be accompanied by the usual hydraulic connections and hoses (not shown). By varying the displacement of piston 44, one can swing the rock picker 10 from a position immediately behind the tractor or other drawing vehicle to a position offset from the path of the tractor.

Figure 4:
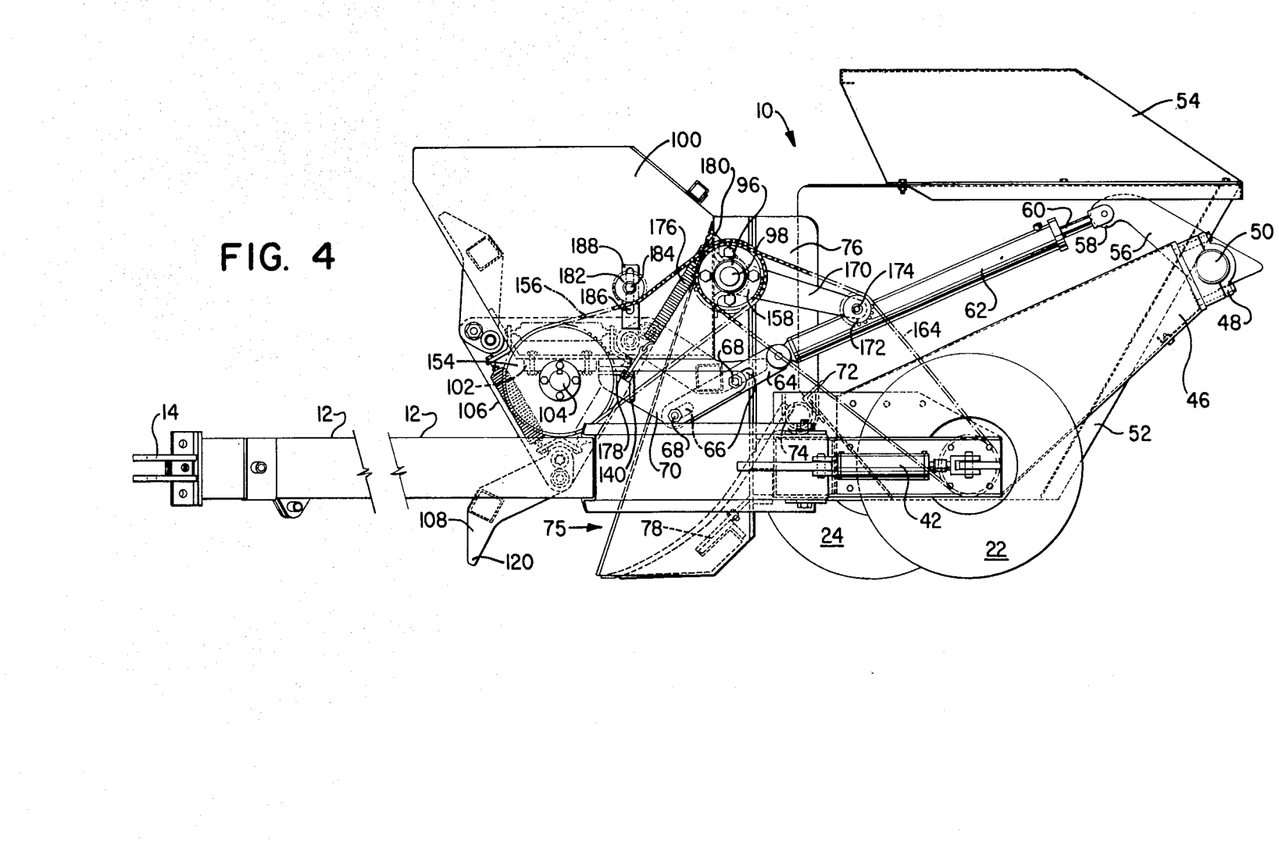
FIG. 4 is a further side elevation view of the embodiment of FIG. 1, showing the draw bar and certain other components of the preferred embodiment which are not present in FIG. 1 were not readily perceived from viewing FIG. 1.
Figure 5:
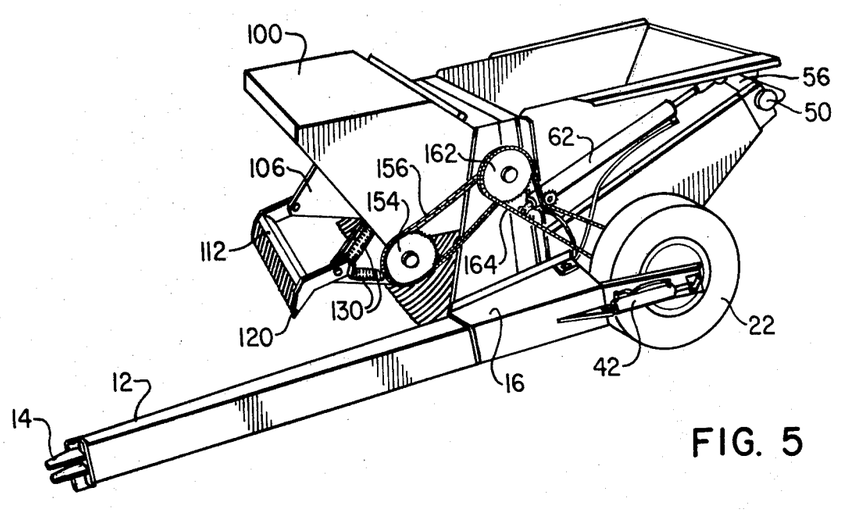
FIG. 5 is a schematic isometric view of the preferred embodiment of the rock picker illustrated in the preceding figures.

Hopper support arms 46 are mounted on either side of the transverse frame element 20 and extend upwardly and rearwardly therefrom to support bearings 48 in which is transversely and pivotally supported a shaft 50. A rock collecting hopper 52 is solidly mounted upon pivotal shaft 50 and is capable of pivotal motion thereabout so as to permit the hopper 52 to dump its load. The hopper 52 may be provided with an optional protective hood or canopy 54 (FIG. 4). Welded to each side of the hopper 52 is a hopper dump arm 56 also pivotally mounted on shaft 50. Each hopper dump arm is pivotally connected at its forward end 58 to a hydraulic piston 60 and cylinder 62, the forward end of the latter being in turn pivotally connected to the rear end of link element 64 provided with slots 66 engaged by bolts 68 which also pass through a generally triangular shaped bracket 70. Dumping of hopper 52 is effected by extending pistons 60. Each side of hopper 52 is provided at its forward edge with an angled guard piece 72 which not only helps to protect the hopper 52 from abrasive wear caused by incoming stones but also serves as an abutment element which, in the rest position of the hopper 52, abuts transverse hollow bar 74 pivotally mounted in U-clamps in the side frame elements 34 and 36, the latter being fixed to the transverse frame element 20.

Figure 6:
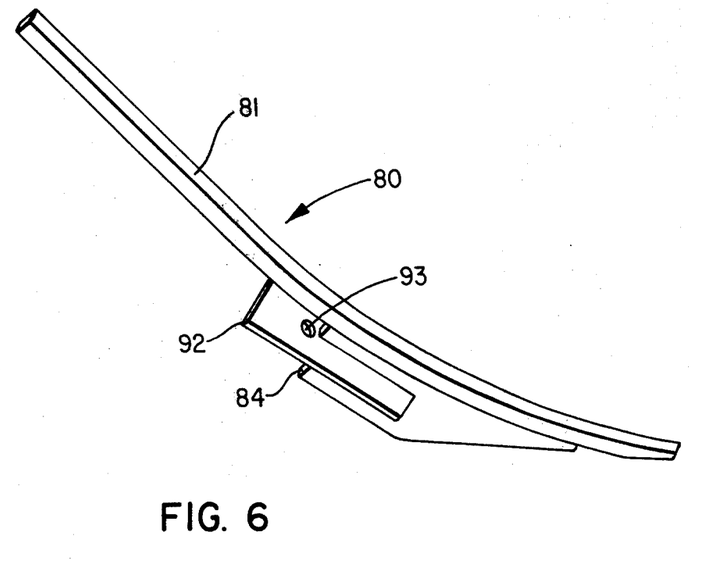
FIG. 6 is an isometric detail view of a grille tooth suitable for use in the rock picker illustrated in the preceding figures.

Solidly mounted about pivotable hollow bar 74 are opposed side support elements 76 for supporting a grille 78 comprised of transversely aligned grille teeth 80. The pivotal mounting enables the entire grille assembly to pivot about a transverse axis coincident with bar 74. The curved upper portion 81 of each tooth projects above the path of travel of the free ends of the paddle teeth 120, and helps to guide rocks and other objects into the hopper 52. Each tooth 80 is provided with a recess, cutaway or receptacle 82 and a shoulder portion 84. The shoulder portion 84 mates with and under upward rearward pressure abuts against one arm 86 of an L-shaped transverse bar or angle iron 88, the other arm 90 of which penetrates the recess 82 of each tooth 80 in a loose fit. Each tooth 80 is additionally provided with a flanged spacer portion 92 provided with a hole 93 through which a removable bolt 94 passes, located to the rear of arm 86 of L-shaped support bar 88. The spacers 92 maintain adequate separation between the upper portions of adjacent grille teeth so as to permit the paddle teeth 120 to pass freely therebetween. Since under normal operation there is no appreciable forward force on the teeth 80, the bolt 94 is sufficient to keep each tooth 80 from falling off the support bar 88. Clearances are sufficient to afford each tooth 80 substantial opportunity for lateral and longitudinal movement on the support bar 88. However, when stresses are imparted to the grille 78, as when on the surface of the earth protruding rocks are encountered, the bearing force is taken by the mating sides of the support bar 88 and shoulder 84 and recess 82 of each tooth 80.

The grille support side plates 76 also support a cylindrical shaft 98 on which are rotatably mounted bushings 96 affixed to the reel support canopy 100. Opposed reinforcement bars 144 fixed to the sides of canopy 100 support opposed bearings 102 which in turn support a transverse shaft 104 on which opposed paddle support plates 106 are rotatably mounted.

Symmetrically located relative to shaft 104 and pivotally mounted on plate 106 by means of bolts 110 are generally radially extending paddles 108. Three paddles are shown; some other small number could be substituted. A cross bar 112 of generally square cross section lends structural support to the transverse array of paddle teeth 114 of which each paddle is comprised. The teeth 114 are spaced so as to pass between the upper portions of adjacent ones of the grille teeth 80 as the reel 116 rotates.

Figure 3:
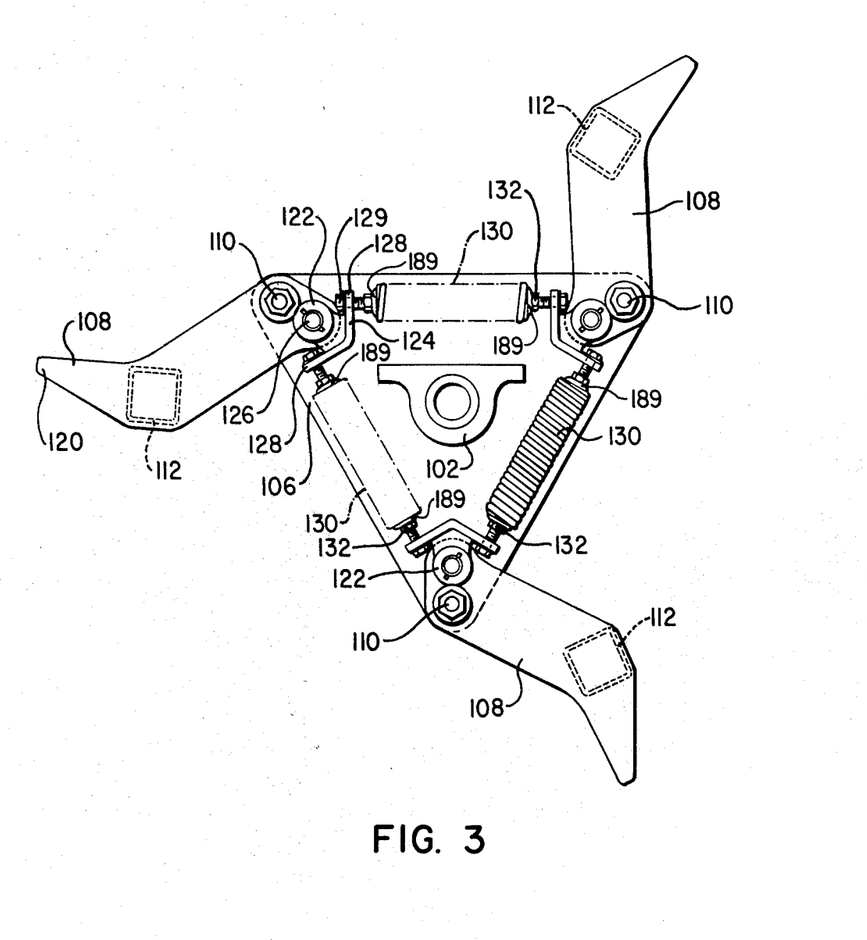
FIG. 3 is a schematic side elevation view, of a scale larger than that of the preceding views, of the paddle-mounting on the reel of the embodiment of the rock picker illustrated in the preceding figures. (The view is reversed relative to FIGS. 1 and 4.)

Pivotally mounted on an inwardly projecting crank extension 122 of each end paddle element is a dual spring mounting element 124, pivotally connected to crank extension 122 by means of pin 126. Each of the spring mounting elements 124 is provided with two flanged spring mounting arms 128 lying symmetrically about the radial line passing between the associated pin 126 and the axis of rotation of the reel 116. Attached to the outermost portions of spring mounting arms 128 are mounting bolts 129 to which in turn are attached coil springs 130. It will be noted that the flanged portions 128 are bent so that the attachment bolts 129 for the coil springs 130 pass substantially perpendicularly through the flanged portions 128. Springs 130 are provided with castings 189 threadably engaged in the ends thereof and bolts 129 are engaged in threaded holes in castings 189 whereby springs 130 are maintained under tension and tend to maintain paddles 108 in the fixed rest position illustrated in FIG. 3. The tension on the springs can be adjusted by tightening or loosening bolts 129. Bolts 129 are secured against undesired rotation relative to castings 189 by locknuts 132.

Figure 1:
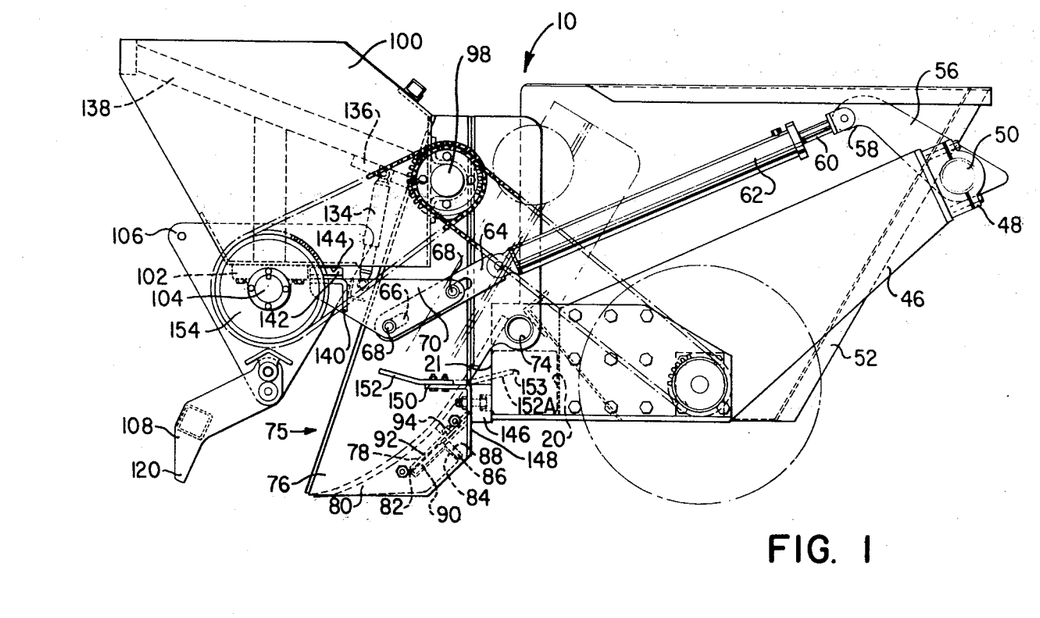
FIG. 1 is a schematic side elevation view of a preferred embodiment of a rock picker according to the present invention, omitting the draw bar and some other elements of the embodiment for the purposes of clarity.
Figure 2:
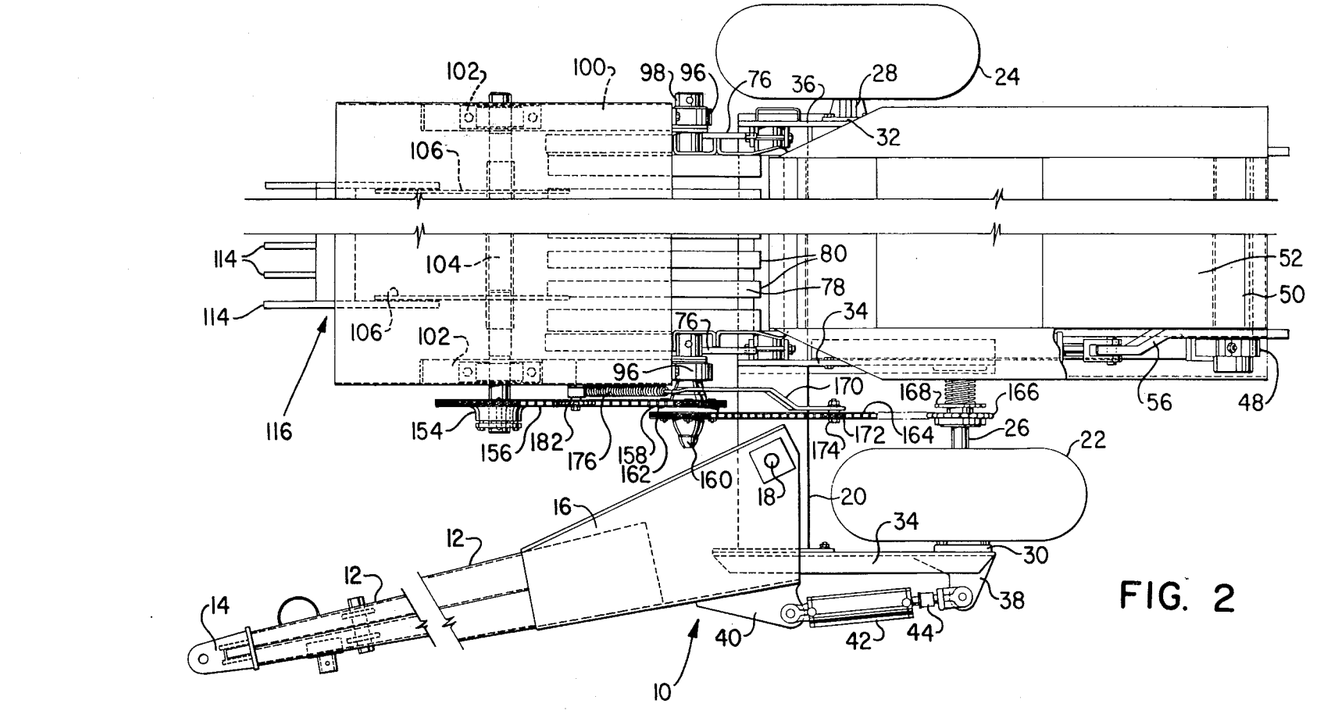
FIG. 2 is a schematic plan view of the rock picker of FIG. 1, again omitting some components for the purposes of providing a clear view.

In normal field operation, the rock picker components will assume the relationship illustrated in FIG. 1. The rest position of the grille assembly is maintained on each side of the grille by means of the abutment of a rubber stop block 146, affixed to an angle bracket 148 suitably fixed to the lower rear portion of grille side frame element 76, against the transverse frame element 20, so that the grille teeth 80 are at or near ground surface level. Intended field operation requires that the piston 60 occupy a position permitting stop 146 to abut frame 20 with bolts 68 resting against the left hand side (as seen in FIG. 1) of slot 66. At any given setting of piston 60, limited pivotal movement of the grille assembly is possible within the limits established by the possible movement of bolts 68 within slots 66. When the grille teeth 80 are at ground surface level, the ends 120 of the paddle teeth 114 will dig very slightly into the ground (the axis of rotation of the reel being slightly forward of the foremost portion of the grille, so that maximum downward projection of the paddles occurs just before the paddle teeth sweep between the grille teeth). Note that if the piston 60 is fully retracted, the grille assembly will be lifted forwardly and upwardly and can be maintained in transport position by means of the mirror reversal of plate 152 to position 152A shown in broken lines in FIG. 1.

The upper horizontal arm 150 of the angle bracket 148 can be used to mount a transport lug bar 152, which in operating position assumes the location illustrated in FIG. 1, but when the rock picker is desired to be transported, can be reversed to assume the broken line position 152A in which position the extreme end 153 of the lug bar 152 will abut the forward face 21 of transverse bar 20, thereby maintaining the grille 75 well above the surface of the ground.

The reel 116 is driven by means of a chain drive passing about sprocket wheel 154 keyed to shaft 104. Drive chain 156 passes also about drive sprocket 158 which is mounted on a common hub 160 with a sprocket 162. Hub 160 is rotatably mounted on shaft 98. Sprocket 162 is driven by a drive chain 164 direct from a sprocket wheel 166. The latter is controllably engaged by a dog clutch 168 which, when engaged, transmits driving power from axle 26 driven by support wheel 22 to sprocket wheel 166. Driving motion passes thence to drive chain 164, sprocket wheel 162, and thence via sprocket wheel 158 and chain drive 156 to sprocket wheel 154 of reel 116. Alternatively, a power take-off unit could be mounted at a convenient location, for example on frame element 20, and a sprocket wheel driven thereby could be provided in chain drive engagement with sprocket 162 (in lieu of the chain drive provided by chain 164, in turn driven by sprocket wheel 166).

A spring-loaded idler arm 170 supports an idler sprocket 172 rotatably mounted on a bolt 174 at the free end of the idler arm 170. Tension spring 176 is connected between a mounting post 178 fixed to angle bracket 140 and crank extension 180 of idler arm 170, thereby maintaining a force on idler roller 172 tending to bear outwardly against the drive chain 164. This force tends to maintain drive chain 164 in satisfactorily tight engagement with sprocket wheels 162 and 166, regardless of the pivotal movement of grille 75 about hollow bar 74.

An important feature, regardless of the source of drive, is that the intermediate driving sprocket for the reel 116 be located on the same shaft about which the floating reel 116 pivots when clearing ground obstacles. Since the distance between the reel axis 104 and the drive shaft 98 is constant, and the distance between shaft 98 and drive sprocket 166 is also constant, apart from minor variations caused by pivotal movement of the grille assembly 75 which is accommodated by idler sprocket 172, the appropriate driving relationships are maintained regardless of the pivotal position assumed by reel 116 in clearing ground obstacles.

Although not essential (provided that drive chain 156 is satisfactorily adjusted) an additional idler sprocket 182, engaging drive chain 156, may be mounted on a bolt 184 adjustably engaging a slot 186 in idler support mounting 188 fixed to canopy 100. By positioning the bolt 184 at a satisfactory position in slot 186, the desired degree of slack can be set in drive chain 156.

In operation, rocks on the surface of the ground are swept towards the grille by paddles 108. As the paddles pass the grille teeth 80, earth and small rocks fall between the grille teeth to return to the ground surface while larger rocks and other larger surface debris are swept past the grille and into hopper 52.

Since there can be a substantial force exerted on the rocks by the paddles 108, canopy 100 and hopper cover 54 are useful in preventing the ejection of rocks out of the rock picker; canopy 100 in particular tends to prevent rocks carried upwardly and forwardly by paddles 108 from striking the cab or the driver of the tractor or other vehicle pulling the rock picker. In the event that an entrenched rock or other substantial suface obstacle is encountered, the shock of the encounter can be absorbed in a number of different ways.

In the first place, individual paddles 108 can deflect about bolts 110 against the tension force of coil springs 130.

In the second place, the entire reel 116 can "float" upwards clockwise about shaft 98. The reel 116 tends to return to its normal operating position through force of gravity. To control lift and return speed on each side of the canopy 100, a double acting shock absorber 134 is connected between triangular element 70 fixed to the corresponding side plate 76 and a mounting post 136 on the underside of a canopy reinforcement beam 138 axially mounted about shaft 98. On each side of the canopy 100, a flange 140 fixed to triangular element 70 supports a rubber stop block 142 which engages the underside of reinforcement bar 144 of canopy 100 to define the rest or operation position of the reel 116.

Furthermore, as mentioned above, the entire grille assembly can pivot upwardly about hollow bar 74 to accommodate small surface variations or obstacles. In so doing, pins 68 fixed to side grille support elements 76 move upwardly and rearwardly in slots 66. The grille 75 tends to return to its rest position under the force of gravity.

Finally, to accommodate relatively small jars resulting from the encounter of the grille with various sizes and shapes of rocks on the earth's surface or swept past the grille by the paddles, the relatively loose mounting of the grille teeth 80 permits the teeth 80 to deflect both sideways and upwardly so that small rocks and other obstacles do not tend to become lodged between adjacent grille teeth 80.

When a load of rocks has been collected in hopper 52, the rock picker can be driven to a suitable location and the load dumped. Dumping is effected by extending piston 60 and cylinder 62. This forces link element 64 forwardly and downwardly so that the slack provided by slot 66 is taken up, and thereafter the force is assumed by the engagement of the stop element 146 with frame element 20. At this point further extension of piston 60 forces crank arm 56 rearwardly, and as a consequence forces the entire hopper 52 to pivot clockwise (as seen in FIGS. 1 and 4) about hollow shaft 50. This permits the load of rocks to be dumped over the rear end of the rock picker. Alternative assemblies are known in the art for providing a so-called "high-lift" dumping action, which is not per se a part of the present invention.

What is claimed is:

1. In a rotary rock picker for moving rocks and other objects, and provided with a frame, a rotatable reel rotatably mounted in the frame, a plurality of substantially identical paddles pivotally mounted on the reel and extending generally symmetrically radially outwardly therefrom, the pivotal axes being substantially parallel to the axis of rotation of the reel, each paddle having transversely spaced paddle teeth for engaging objects to be moved, the improvement comprising:
   a grille fixed to the frame and swept by the paddles comprising a transverse tooth support bar and a plurality of substantially identical transversely spaced and aligned individual slightly deflectable grille teeth removably mounted on the bar;
   each tooth having an upper relatively narrow portion elongated in the circumferential direction relative to the reel, a lower spacer portion transversely wider than the upper portion for spacing the upper portions of adjacent grille teeth from one another, a shoulder providing a substantially radial bearing face in the same direction as the sweep of the paddles, and attachment means for removably attaching the tooth to the tooth support bar;
   the paddle teeth in operation of the apparatus sweeping between adjacent upper portions of the grille teeth;
   the tooth support bar having a bearing face facing and mating with and for engaging the radial bearing faces of the grille teeth.

2. The improvement defined in claim 1, wherein the transverse tooth support bar has an L-shaped cross-section, a first leg of the L providing an interior face constituting said bearing face, the second leg of the L projecting from the first leg in a direction generally opposite to the direction of the sweep of the paddles, each grille tooth is provided with a recess adjacent the shoulder mating with and receiving the second leg of the L in a loose fit, and the attachment means for each grille tooth is removably secured to the grille tooth and projects generally radially outwardly from the grille tooth and is engageable with the exterior face of the first leg of the L.

3. The improvement defined in claim 2, wherein the securing means for each tooth is a bolt removably fastened to a bolt receptacle in the spacer portion of the tooth.

4. In a rotary rock picker for moving rocks and other objects and provided with a rotatable reel and at least three paddles pivotally mounted thereon and extending generally outwardly radially therefrom, the pivotal axes for the paddles being parallel to the reel axis of rotation, an improved spring-loaded mounting for the paddles comprising, at each end of the reel;
   an identical dual spring mounting element for each paddle and fixed thereto, each said spring mounting element having a pair of spring mounting arms symmetrically located about a radial line from the axis of rotation of the reel to the pivotal axis of the paddle;
   between every adjacent pair of said paddles, substantially identical coil springs normally under light tension connected between the spring mounting posts most proximate to one another for said adjacent pair of paddles.

5. A rotary rock picker comprising:
   a frame;
   support wheels for the frame;
   a hopper for collecting rocks transversely pivotally connected to the frame and extending generally rearwardly therefrom;

a grille assembly support frame pivotally attached to the frame about a transverse pivotal axis;

a grille comprising a plurality of forwardly extending spaced grille teeth transversely mounted on the grille assembly support frame, the upper rearward portion of the grille teeth being located proximate to the forward portion of the hopper, and the forward portion of the grille teeth being located proximate to the surface of the ground when the rock picker is in operation;

reel support means transversely pivotally mounted on the grille assembly support frame on an axis substantially parallel with but spaced from the pivotal axis of the grille assembly, said reel support means extending generally forwardly of and above the grille;

a reel transversely rotatably mounted in the reel support means, the reel and the grille being movable independently of one another;

a source of rotary motive power for the reel;

at least three spring-loaded generally radially extending paddles transversely pivotally mounted on the reel, the paddles being substantially identical to one another and spaced substantially symmetrically from one another circumferentially about the reel;

the paddles being provided with generally radially extending spaced paddle teeth the free ends of adjacent ones of which in operation of the rock picker sweep between adjacent ones of the grille teeth.

6. The drive mechanism of claim 5, wherein each of said means for imparting rotary motion comprises an endless belt.

7. A rotary rock picker comprising a frame;

support wheels for the frame;

a hopper for collecting rocks transversely pivotally connected to the frame and extending generally rearwardly therefrom;

a grille comprising spaced grille teeth transversely mounted on the frame, the upper rearward portion of the grille teeth being located proximate to the forward portion of the hopper, and the forward portion of the grille teeth being located proximate to the surface of the ground when the rock picker is in operation;

reel support means transversely pivotally mounted on the frame and extending generally forwardly of and above the grille;

a reel transversely rotatably mounted in the reel support means;

a source of rotary motive power for the reel;

at least three paddles transversely pivotally mounted on the reel, the paddles being substantially identical to one another and spaced substantially symmetrically from one another circumferentially about the reel;

the paddles being provided with generally radially extending spaced paddle teeth the free ends of adjacent ones of which in operation of the rock picker sweep between adjacent ones of the grille teeth; and adjacent ones of said paddles being coupled to one another by springs under tension which tend to maintain the paddles in preferred radial orientation whilst permitting deflection of the paddles from preferred orientation.

8. A rotary rock picker comprising:

a frame;

support wheels for the frame;

a hopper for collecting rocks transversely pivotally connected to the frame and extending generally rearwardly therefrom;

a grille comprising spaced grille teeth transversely mounted on the frame, the upper rearward portion of the grille teeth being located proximate to the forward portion of the hopper, and the forward portion of the grille teeth being located proximate to the surface of the ground when the rock picker is in operation;

reel support means transversely mounted on said frame for pivotal movement about an axis and extending generally forwardly of and above the grille;

a reel transversely mounted in the reel support means for rotation about an axis parallel to said axis for pivotal movement of said reel support means;

a source of rotary motive power for the reel;

at least three paddles transversely pivotally mounted on the reel, the paddles being substantially identical to one another and spaced substantially equally from one another circumferentially about the reel;

the paddles being provided with generally radially extending spaced paddle teeth the free ends of adjacent ones of which in operation of the rock picker sweep between adjacent ones of the grille teeth;

an intermediate rotating element rotatably mounted on the frame about an axis of rotation coincident with the axis of said reel support means;

means for imparting rotary motion from the source of rotary motive power to the intermediate rotating element; and means for imparting rotary motion from the intermediate rotating element to the reel.

9. A rock picker as defined in claim 8, wherein each of the means for imparting rotary motion comprises an endless belt.

10. A rock picker as defined in claim 9, wherein the reel support means comprises a protective canopy covering generally the uppermost portion of the reel, whereby rocks or other objects swept upwardly by the paddles and which have a forward component of momentum tend to strike the canopy and deflect downwardly.

11. A rock picker as defined in claim 10, wherein adjacent ones of said paddles are coupled to one another by springs under tension which tend to maintain the paddles in preferred radial orientation whilst permitting deflection of the paddles from preferred orientation.

12. A rock picker as defined in claim 11 wherein the frame includes a transverse support member, and additionally comprising a drawbar pivotally attached to the transverse support member at one side thereof about a substantially vertical axis, and means for selectively varying the angle between the drawbar and the transverse support member.

13. A rock picker as defined in claim 11, wherein the grille comprises a transverse tooth support bar having an L-shaped cross-section, and the grille teeth are each provided with a shoulder and a recess adjacent thereto for engaging and bearing against the tooth support bar, and are each further provided with a removable bolt for retaining the teeth on the tooth support bar.

14. A rock picker as defined in claim 13, wherein the recess of each of the grille teeth receives the tooth support bar in a loose fit.

15. A rotary rock picker as defined in claim 1, 2 or 7 wherein the grille is transversely pivotally mounted on the frame.

16. A rotary rock picker as defined in claim 1, 7 or 8, wherein the grille and the reel can be moved separately and independently of one another so as to enable the relative distance between the two to be varied.

17. A rotary rock picker as defined in claim 7, wherein the grille and the reel can be moved separately and independently of one another so as to enable the relative distance between the two to be varied.

18. A rotary rock picker as defined in claim 7, 8 or 5, wherein the grille teeth are slightly deflectable in character, are loosely connected to their supporting means, and are separately detachable from the supporting means.

19. A rotary rock picker as defined in claim 1, 7 or 5, wherein the rock picker is towed by means of a draw bar connected to the rock picker and the connecting angle between the draw bar and the rock picker can be controllably varied.

20. A rotary rock picker as defined in claim 8, wherein each of said means for imparting rotary motion comprises an endless chain.

21. A rotary rock picker as defined in claim 1, 4 or 5, wherein the drive mechanism for imparting rotary motion to the reel comprises:

a source of rotary motive power;
an intermediate rotating element having an axis of rotation coincident with the reel support pivotal axis;
means for imparting rotary motion from the source of rotary motive power to the intermediate rotating element; and
means for imparting rotary motion from the intermediate rotating element to the reel.

22. In a rotary rock picker for moving rocks and other objects and provided with a frame, a rotatable reel having a plurality of paddles pivotally mounted thereon and extending generally radially outwardly therefrom, said reel being rotatably mounted about a transverse axis, and means mounting said transverse axis on said frame for pivotal movement about an axis which is parallel to said transverse axis, an improved drive mechanism for imparting rotary motion to the reel, said drive mechanism comprising:

a source of rotary power mounted on said frame;
an intermediate rotating element rotatably mounted on said frame about an axis of rotation coincident with the axis of said limited pivotal movement;
means for imparting rotary motion from said source to said intermediate rotating element; and
means for imparting rotary motion from said intermediate rotating element to said reel.

* * * * *

UNITED STATES PATENT OFFICE
CERTIFICATE OF CORRECTION

PATENT NO. : 4,319,641
DATED : March 16, 1982
INVENTOR(S) : Wilfred J. Degelman

It is certified that error appears in the above-identified patent and that said Letters Patent are hereby corrected as shown below:

Claim 6, delete the numeral "5" and substitute therefore the numeral -- 22 --.

Signed and Sealed this

Eighteenth Day of May 1982

[SEAL]

Attest:

Attesting Officer

GERALD J. MOSSINGHOFF

Commissioner of Patents and Trademarks